(No Model.)
G. A. SMITH.
CUSHION TIRE.
No. 588,362.                            Patented Aug. 17, 1897.
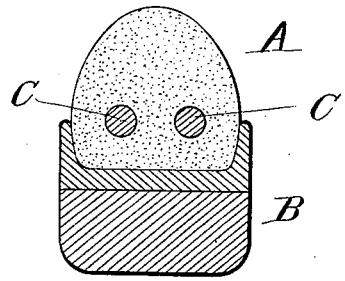
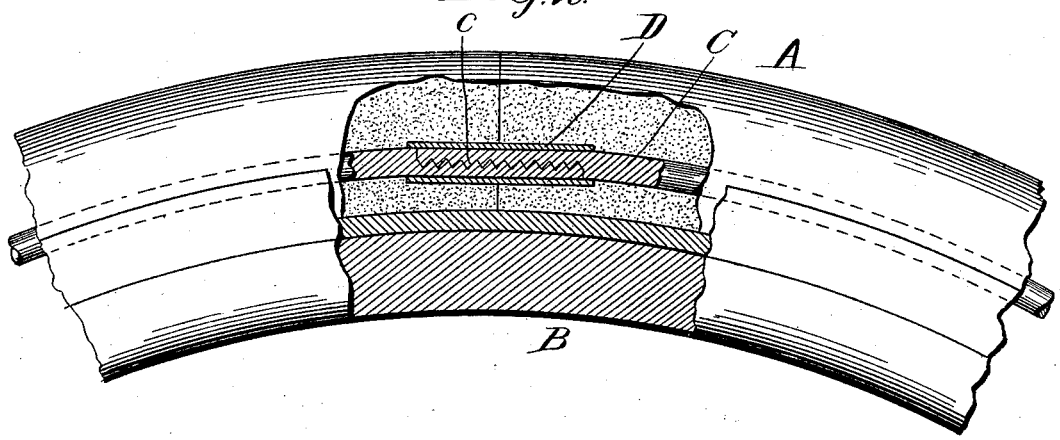
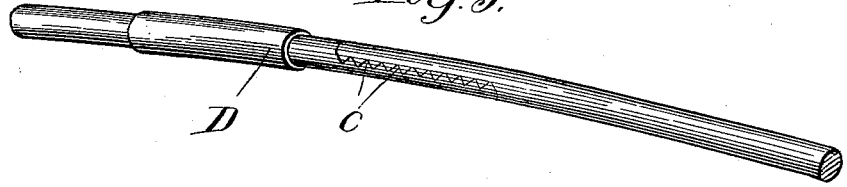
Witnesses:
A. F. Durand.
R. M. Wagner.
Inventor:
George A. Smith
by Page & Belfield
Attys.

UNITED STATES PATENT OFFICE.

GEORGE A. SMITH, OF CHICAGO, ILLINOIS.

CUSHION-TIRE.

SPECIFICATION forming part of Letters Patent No. 588,362, dated August 17, 1897.

Application filed March 27, 1897. Serial No. 629,486. (No model.)

*To all whom it may concern:*

Be it known that I, GEORGE A. SMITH, a citizen of the United States, residing at Chicago, in the county of Cook and State of Illinois, have invented a certain new and useful Improvement in Cushion-Tires for Vehicles, of which the following is a specification.

My invention relates to elastic cushion-tires for vehicles of the kind in which the tire comprises a rubber or equivalent elastic strip of a length to extend around the wheel-rim and provided with one or more longitudinally-extending bores for a wire or wires by which the tire is fastened and held in place. Cushion-tires of such nature are generally characterized as "solid" cushion-tires, since the tire, which is formed of a piece of rubber of suitable length and transverse sectional dimension, is solid with the exception of one or more small longitudinally-extending bores corresponding in area with the fastening wire or wires employed. Prior to my invention various ways for securing together the ends of the fastening-wires have been proposed, the generally-adopted mode of securing them, however, being to electrically weld together their meeting ends, since by such method the endless band composed of a wire having its ends thus welded together is not subject to longitudinal stretch or elongation and also avoids objectionable expansion of the bore within which it is confined.

Prominent objects of my invention are to avoid the expense of an electric plant for welding, to permit the wire ends to be easily and properly secured in shops where the use of electricity for welding purposes is not practical, to permit the wire ends to be fastened together without skilled labor, to permit them to be relatively adjusted so as to tighten the wire to a desired extent, to avoid undue lateral expansion of the bore in which the wire is confined and thereby maintain the tire in a uniform condition throughout, and at the same time provide fastening means whereby the wire is not liable to break at the point where its ends are secured together.

To the attainment of the foregoing and other useful ends I employ a fastening-wire somewhat longer than the tire, so that when the tire is arranged upon the wheel and its ends brought together the end portions of the wire may lap one another within the tire. The opposing lapping sides of these end portions of the wire are formed with corresponding toothed offsets, which extend back from the terminals of the wire, by which arrangement the end portions of the wire when fitted and locked together may unite to form a part of an endless band having a uniform diameter throughout. These toothed end portions of the wire can be adjusted upon one another, so as to suitably tighten up the wire, and when fitted together their toothed faces will interlock, so as to cause a positive engagement between the end portions of the wire. To prevent lateral displacement of these interlocking end portions of the wire, I arrange upon the latter a sleeve which can be fitted to slide upon the wire back of either of its toothed end portions preparatory to slipping it over the interlocking ends of the wire. The sleeve can be made comparatively thin, so as not to materially expand the bore of the tire, and since the joint formed by the lapping end portions of the wire is of the same size as the wire back of such joint the bore of the sleeve can be made to correspond with the uniform diameter of a piece of round wire employed for fastening a tire upon the wheel. When the sleeve is thus placed over the joint in the wire band, it will be held against end slip by the elastic pressure of the rubber material in which it is practically embedded.

In the accompanying drawings, Figure 1 is a section taken transversely through the cushion-tire provided with a couple of fastening-wires and seated upon a wheel-rim. Fig. 2 illustrates a portion of the wheel-rim and cushion-tire in side elevation, parts of the same being broken away and shown in central longitudinal section. Fig. 3 shows in perspective a portion of the fastening-wire with the sleeve slipped back so as to expose the joint.

The solid-rubber cushion-tire A is of ordinary form and is provided with a couple of longitudinally-extending bores for the fastening-wires C C, one of which is drawn within each bore. The cushion-tire is made of a length to extend around the wheel-rim and permit its ends to meet thereon, and is, as usual, seated in a channel on the wheel-rim B, the channel being preferably formed by a band of channel-iron such as is commonly used upon vehicle-wheels having cushion-tires. The wire is somewhat longer than the length of the tire, so that when the ends of the tire are brought together the end portions of the wire can lap one another within the tire, as in Fig. 2.

The lapping end portions of the wire are formed with corresponding offsets extending back from their terminals and having opposite toothed faces which interlock when the end portions of the wire are brought together and lapped. Each end portion of the wire is reduced in diameter by reason of its offset to an extent whereby when the ends of the wire lap and lock together, as in Figs. 2 and 3, the part of the wire comprising such lapping end portions will correspond in diameter with the diameter of the remaining portion of the wire. By such arrangement I can provide a comparatively thin metal sleeve D having the diameter of its bore corresponding with the diameter of the wire and arranged to fit and slide both upon the main portion of the wire and also upon the part of the wire circle formed by the two lapping end-interlocking portions of the wire.

Preparatory to lapping the end portions of the wire the sleeve will be pushed back upon the wire, as in Fig. 3, and can temporarily lie within one end portion of the tire, the elasticity of the latter permitting the sleeve to be pushed back within the bore through which the wire extends, it being also noted that as the external diameter of the sleeve is but little greater than the general diameter of the wire the presence of the sleeve within the tire will expand the portion of the tire-bore which it occupies to a trifling extent only.

When the ends of the tire are brought together, one terminal of the wire can be caused to pass its opposite terminal to an extent to bring its two end portions into relative position to lap one another within the bore of the tire, and as these end portions, by reason of their interlocking toothed offsets, fit the one in the other the part of the tire-bore occupied by the two lapping end portions of the wire will resume its normal general sectional area when such end portions of the wire are thus fitted together. After these end portions of the wire have been properly fitted together the sleeve can be slipped over them, it being understood that during such manipulations one or both ends of the tire can be temporarily compressed and crowded back upon the wire to the desired extent. It will also be observed that the interlocking sides of the wire positively engage one another and that the sleeve prevents lateral displacement after they have been thus interlocked. By such arrangement, therefore, the end portions of the wire can be relatively adjusted before slipping the sleeve upon them, whereby the wire can be drawn as tight as may be desired, it being observed that the end portions of the wire can be effectively locked together whether their terminals are brought against the shoulders formed by the offsets or whether the said terminals do not extend up to such shoulders.

What I claim as my invention is—

The combination of a solid cushion-tire provided with one or more longitudinally-extending bores and seated in the peripherally-arranged channel of a wheel-rim; a fastening-wire extending through each bore of the tire and having lapping, interlocking end portions provided with corresponding offsets formed with toothed faces and arranged to meet and form a band having its diameter along the joint corresponding with its diameter back of the joint; and a sleeve confined within the tire and arranged over the joint in the wire band to prevent lateral displacement of the lapping end portions of the wire and having its bore corresponding with the diameter of the wire band both along the joint and back of the same, substantially as described.

GEORGE A. SMITH.

Witnesses:
A. F. DURAND,
R. M. WAGNER.